United States Patent [19]

Goodman

[11] 4,440,330
[45] Apr. 3, 1984

[54] REAR CARRIER FOR MOTORCYCLES AND THE LIKE

[76] Inventor: Clarence R. Goodman, 4727 W. Marlette, Glendale, Ariz. 85301

[21] Appl. No.: 314,176

[22] Filed: Oct. 23, 1981

[51] Int. Cl.³ .............................................. B62J 7/04
[52] U.S. Cl. ................................... 224/30 R; 224/31; 224/32 R; 224/32 A; 280/289 R; 280/289 A
[58] Field of Search ............... 224/30 R, 32 R, 32 A, 224/34, 39, 31, 33 R, 37; 280/202, 289 R, 289 A

[56] References Cited

U.S. PATENT DOCUMENTS

| | | | |
|---|---|---|---|
| 3,788,532 | 1/1974 | Bish | 224/32 A X |
| 3,901,534 | 8/1975 | Popken | 224/31 X |
| 4,050,615 | 9/1977 | Kline | 224/32 A |
| 4,096,980 | 6/1978 | Clow | 224/39 |
| 4,163,513 | 8/1979 | Kramer | 224/32 R |
| 4,230,245 | 10/1980 | Polo et al. | 224/32 A X |
| 4,257,544 | 3/1981 | Dierkes | 224/32 A |
| 4,260,085 | 4/1981 | Jefferson | 224/31 X |
| 4,269,335 | 5/1981 | LaRose et al. | 224/32 A X |
| 4,311,261 | 1/1982 | Anderson et al. | 224/32 A X |

Primary Examiner—William Price
Assistant Examiner—Gary E. Elkins
Attorney, Agent, or Firm—Gregory J. Nelson

[57] ABSTRACT

A rear carrier for use with motorcycles and other types of cycles. The carrier has a platform, opposite side panels and forwardly extending arms. The platform, panels and arms are injection molded from suitable synthetic or polymeric material. Channel members extend longitudinally along the inside of the arms for attachment to the frame of the cycle to distribute the loading along the arm. In other embodiments, the carrier may be provided with an adjustable backrest and may further be provided with hinged platform to provide access to subjacent compartments.

6 Claims, 7 Drawing Figures

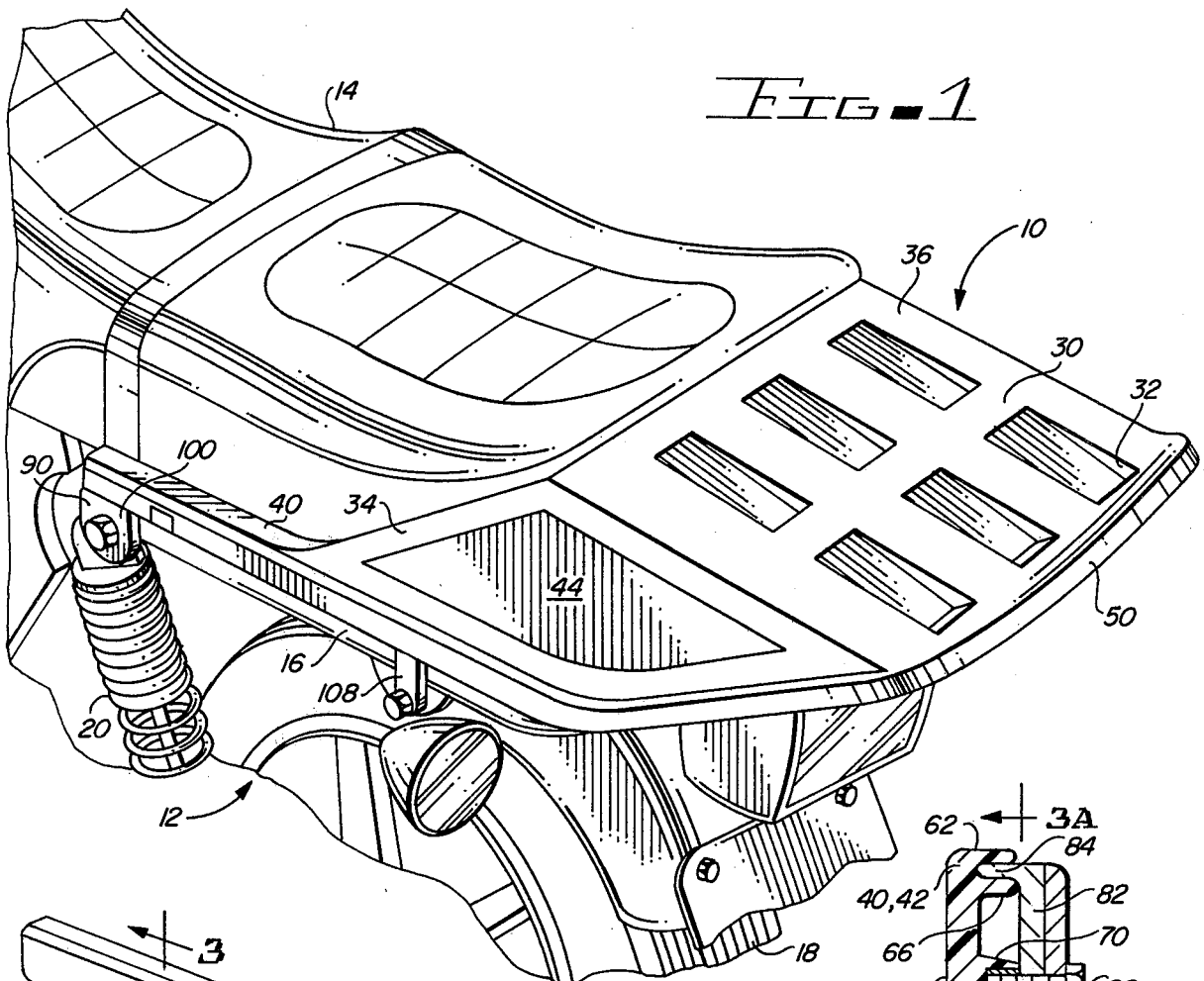
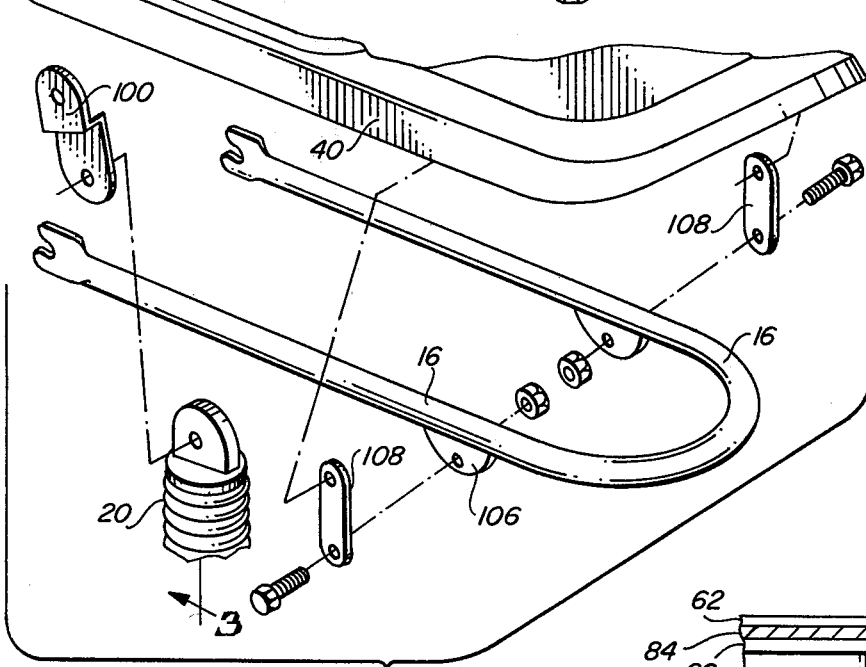
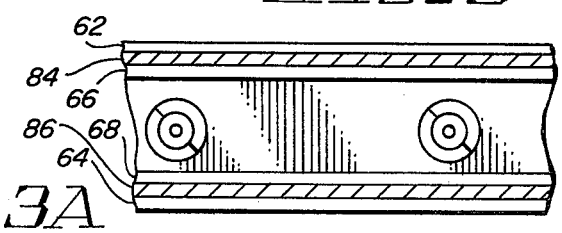

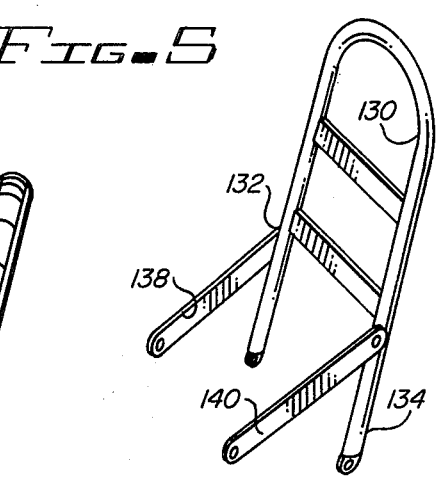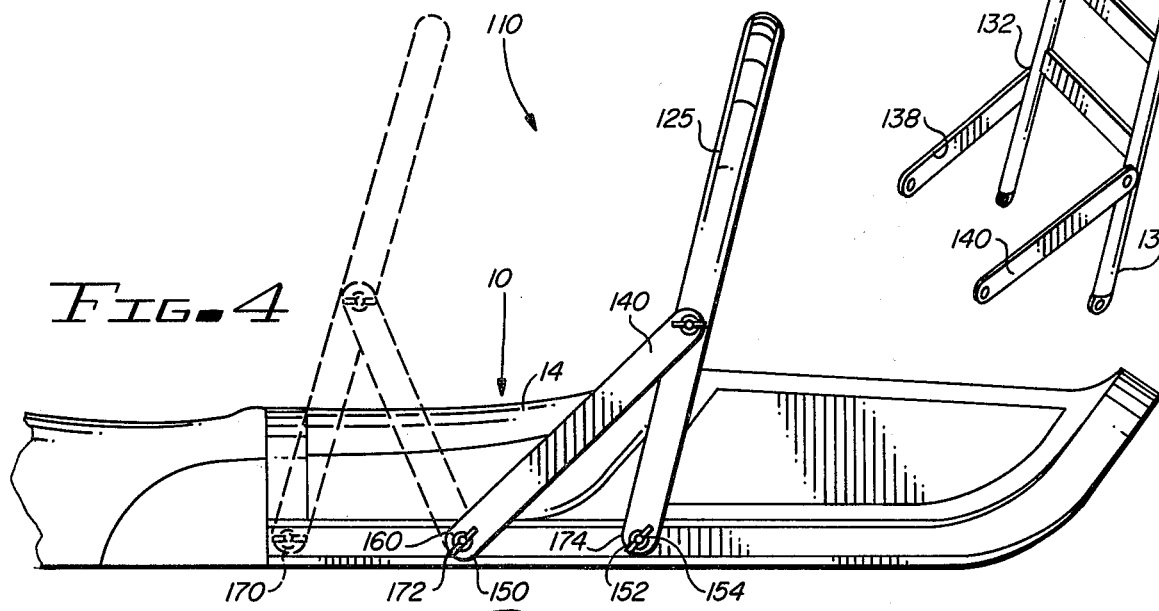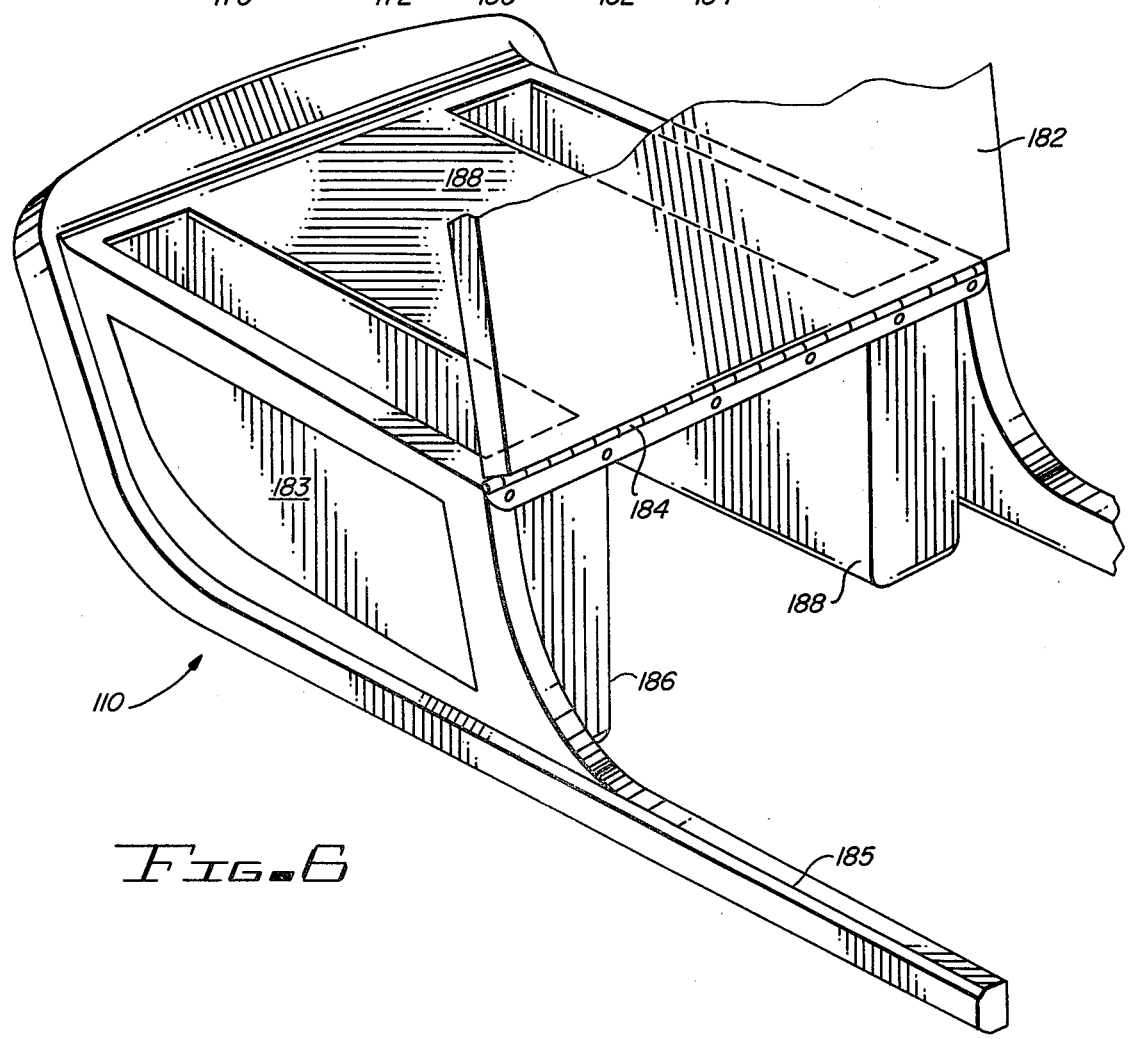

REAR CARRIER FOR MOTORCYCLES AND THE LIKE

The present invention relates to a luggage rack or carrier for motorcycles, motorbikes and similar cycles.

More particularly, the present invention relates to a rear rack or carrier for use on motorcycles and similar cycles which is secured to the frame of the bike. The terms "rack" and "carrier" are used interchangeably throughout to designate a device for supporting and transporting luggage, light cargo and packages on a motorcycle or motorbike. Rear carriers on motorcycles are often provided as original equipment or accessory items. Generally, these carriers are welded from steel, either tubing or stampings and chrome plated for appearance and rust resistance. Carriers of this type are generally supported by attachment to the motorcycle frame at some suitable location and they may also be partially supported on the rear fender of the cycle. In various modifications of this basic design, the carrier may be pivotable from a horizontal to a generally vertical position to serve as a backrest such as the type shown in U.S. Pat. No. 3,901,534. Generally, these conventional steel motorcycle racks are expensive to construct due to the fabrication techniques involved in forming the steel. Further, steel racks due to their design, have substantial weight. The manufacturer also must generally offer a wide variety of configurations and models to adapt to various makes and models of cycles. The inherent design and construction of these conventional designs also serve to limit the aesthetic and decorative features possible.

The present invention effectively solves the above-mentioned problem attendant to conventional rear carrier devices and provides a rack or carrier which is compatible with a wide range of motorcycle makes and models. Briefly, the present invention provides a unitary injection molded carrier formed from thermoplastic material or other synthetic such as nylon or reinforced nylon. Steel reinforcing channels extend horizontally along the side of the carrier and serve to distribute the load at the points of attachment to the cycle frame along the carrier. The carrier is cantilevered and the basic carrier design can be made to accomodate a variety of motorcycle makes and designs with a hardware adaptor kit.

The rack can be provided in various shapes and sizes consistent with aesthetic considerations. Decorative inserts can also be applied. Various optional accessories such as a light bar and compartments may be attached to the basic rack at the option of the user. The synthetic material is selected to damp the high-frequency, low amplitude vibrations generally encountered by the operation of a motorcycle.

The above and other objects and advantages of the present invention will become more apparent with reference to the accompanying drawings showing preferred embodiments of the present invention in which:

FIG. 1 is a perspective view of the cycle carrier of the present invention positioned on a motorcycle;

FIG. 2 is a partial exploded view of the carrier of the present invention mounted on a motorcycle;

FIG. 3 is a cross-sectional view taken along lines 3—3 of FIG. 2;

FIG. 3A is a cross-sectional view taken along lines 3A—3A of FIG. 3;

FIG. 4 is a side view illustrating the rack in connection with an optional backrest;

FIG. 5 is a rear view illustrating the backrest; and

FIG. 6 is a perspective view showing the rack of the present invention in connection with an accessory travel trunk.

Turning now to the drawings, particularly FIGS. 1 to 3, the cycle carrier is generally designated by the numeral 10. Throughout the description, the rack or carrier 10 will be described with reference to a motorcycle, it being apparent that the carrier may be used with other types of cycles such as motorbikes, mopeds and the like. The carrier is secured to the rear of the motorcycle 12 which has seat 14 and U-shaped rear frame member 16. Motorcycle is equipped with a rear wheel 18 with a shock absorber 20 extending between the lower rear frame member and upper frame member 16.

The carrier 10 of the present invention in the embodiment illustrated includes a generally horizontal load supporting platform 30 disposed at the rear of seat 14. Platform 30 may be provided with a plurality of recesses 32 which increase in depth, progressive rearwardly. The terms "front" and "rear" are used for purposes of orientation with reference to motorcycle 12 only and not by way of limitation. Similarly, the term "side" is used to designate the opposite sides of the motorcycle 12.

A plurality of recesses 32 are provided in platform 30 for aesthetic considerations and also serve to retain articles on the platform. Carrier 10 is formed having side panels 34 and 36 which extend downwardly at opposite sides of the platform 30. Side panels 34 and 36 are selected having the appropriate shape consistent with the motorcycle and also consistent with aesthetic considerations. In cross section, platform 30 and the side panels 34 and 36 form a generally U-shape supported above the rear fender of the cycle with panels 34 and 36 extending downwardly at either side at the rear of seat 14.

The forward ends of panels 34 and 36 are formed having supporting arms 40 and 42 which extend forwardly from the lower edge of the side panels 34 and 36 respectively. For decorative purposes, insert 44 or other decorative members may be applied to the side panels 34 and 36 to coordinate with the motorcycle 12. To further restrain luggage or passenger supported on the platform 30, the rear edge of platform 30 may be slightly upwardly turned at 50 forming a lip or flange.

The carrier consisting of platform 30, side panels 34, 36 and arms 40, 42 is preferably fabricated from a suitable synthetic material and formed as a single unitary structure by injection molding techniques. Synthetics provide light-weight and strength and various materials such as polyvinyl chloride, A.B.S. or structural nylon may be used. Structural nylon such as the type sold by Dupont under the trademark "Zytel", which has had wide application in the space program, has been found to be particularly suitable because of its toughness, energy-absorbent characteristics and resiliency.

Synthetic materials while providing certain advantages, characteristically do not withstand application of point loads. Accordingly, the carrier of the present invention is provided with an integral beam or channel member for distributing point loads applied at the mounting locations. Turning to FIGS. 2, 3 and 3A, it will be seen that both arm 40 and arm 42 are provided with web portion 60 and upper flange 62 and a lower flange 64. Flanges 66 and 68 are inwardly spaced from upper and lower flanges 62 and 64, respectively, and extend along arms 40 and 42. A plurality of longitudinally spaced-apart bosses 70 are provided on the interior of web 60 for attaching the channel to the arms.

Reinforcing channel 86 extends along the interior of arms 40 and 42 terminating at a location at the rear of arms 40 and 42. Referring, for example, to arm 40, channel 86 is generally U-shaped having a web 82 and top and bottom inwardly extending flanges 84 and 85. Flanges 84 and 85 are adapted to be received within the recesses formed between flanges 62, 66 and 68, 64, respectively, in arms 40 and 42. As best seen in FIG. 3, mechanical fasteners 88 are provided at spaced-apart locations extending through the web 82 of channel 86 into the bosses 76 in the arms 40 and 42.

Carrier 10 may be attached to the frame of the motorcycle 12 at appropriate locations along the channels 86 at either side of the platform. For example, the channels 86 may be secured to the locations at opposite sides of the motorcycle 12 where the upper bolt 90 secures shock absorber 20 to the frame. It may be necessary to insert a bracket such as a Z-bracket 100. Z-bracket 100 is secured at one end at bolt 90 and the opposite end attached to channel 80 by a fastener 88 at one of the bosses 70. At the rear of the carrier, channel 86 may be secured to frame member 16 at a suitable tab 106 by bracket 108 extending between the frame 16 and one of the bosses 70 along the channel 80.

FIGS. 4 and 5 show an alternate embodiment of the present invention generally designated by the numeral 110. In embodiment 110, the motorcycle carrier 10 is as has been described with reference to FIGS. 1 to 3 and carries the reference numerals described in connection with those figures. Further detailed description of the carrier assembly is not deemed necessary. In embodiment 110, carrier 10 is shown with a backrest which is positionable at either the front or the rear of the rack. The backrest is generally designated by the numeral 125. Backrest 125 is for support of either the rider or passenger and can be easily positioned at either of the locations as shown in FIG. 4. In the forward position, the backrest is adapted to support the driver. In the rearward position, the backrest is at the rear of the passenger section of seat 14.

The backrest consists of a U-shaped frame 130 having opposite depending legs 132 and 134. Diagonally extending braces 138 and 140 are pivotally secured at their upper ends to the legs 132 and 134 respectively. Preferably the entire backrest 125 is constructed from the same material as the carrier. As mentioned above, this material may be any suitable synthetic material such as PVC, ABS or reinforced nylon and may be suitably shaped for styling and appearance.

The terminal ends of braces 138, 140 and legs 130, 132 are provided with flattened mounting portions 150 and 152 each defining an aperture 154. The mounting portions 150 and 152 are secured to opposite sides of the arms 40, 42 by fastener 160 securable in threaded sockets 170, 172 and 174 equally spaced along the arms. For example, in the forward position as shown in dotted in FIG. 4, the backrest serves to support the motorcycle driver. In the rear position shown in full lines in FIG. 4, legs 130 and 132 are secured in rearward bores 174 by fasteners 160 at opposite arms 40 and 42. The braces extend rearwardly and are secured at holes 172.

In the event the rider wishes to mount the backrest at the front of the platform, fastener 160 is removed and the backrest reversed as shown in dotted and secured in bores 170 with the angular brace 138 extending forwardly as shown secured at mounting holes 172.

FIG. 5 shows still another embodiment of the present invention in which the rack is generally designated by the numeral 180 and is constructed generally as has been described with reference to FIGS. 1 to 3 with side panels 183 and forwardly extending mounting arms 184. However, in this embodiment, the upper platform 182 is hingedly secured at transverse hinge 184 so the entire platform 182 may be pivoted upwardly for access to the contents of subjacent compartments 186 and 188. The compartments may be for any suitable purpose such as carrying personal belongings, tools, or the like. The compartments are integrally formed with the rack and may be injection molded.

Accordingly, it will be seen that the present invention provides a unique carrier or rack adaptable to vehicles such as motorcycles. The unique carrier is of synthetic plastic material for long life and resistance to rust. The unique mounting system distributes loads through the unit to minimize point loads. Engineering tests indicate that the strength of luggage carriers constructed as described above, is several times that of conventional welded steel tubing. Because the carrier is injection molded, styling features not possible as conventional steel racks can be incorporated.

It will be obvious to those skilled in the art to make various changes, alterations and modifications to the carrier or rack of the present invention. To the extent those changes, alterations and modifications do not depart from the spirit and scope of the appended claims, they are intended to be encompassed therein.

I claim:

1. A rear mounted carrier for a cycle having a frame comprising:
    (a) a substantially horizontal platform defining a load supporting surface, said platform having front, rear and opposite sides;
    (b) support arms secured at the opposite sides of said platform, said arms extending generally forwardly at either side of the platform, said platform and arms being plastic and injection molded as a unitary structure;
    (c) metal reinforcing channel means extending along the inner side of each of said support arms, said metal reinforcing channel means being generally U-shaped having a web portion and extending flanges, the flanges of said reinforcing channel means engaging said support arms;
    (d) boss means extending between said metal reinforcing channel and said support arms at predetermined spaced apart locations; and
    (e) mechanical fastener means extending at selected of said bosses between said metal reinforcing channel and said support arm and securing the same together whereby loads imposed at the points of attachment of said support arms and reinforcing channel are distributed along the carrier when said platform is secured to said vehicle.

2. The carrier of claim 1 wherein said platform and arms are fabricated from nylon.

3. The carrier of claim 1 wherein said platform and arms are fabricated from thermoplastic material.

4. The device of claim 1 further including backrest means having a frame, cross supports and depending arms, said arms being detachably securable at locations along the arms of said carrier.

5. The carrier of claim 1 further wherein said platform includes a hinged cover member and further including compartment means disposed subjacent said cover member whereby access to said compartment is provided by pivoting said cover member to an open position.

6. The carrier of claim 1 wherein said support arms form a side panel secured at each side of said platform, said side panels being adapted for reception of decorative means thereon.

* * * * *